(12) United States Patent
Dillard

(10) Patent No.: US 7,392,112 B2
(45) Date of Patent: Jun. 24, 2008

(54) SYSTEMS AND METHODS FOR REAL-TIME FUEL INVENTORY CONTROL

(75) Inventor: Donald Dillard, El Dorado, AR (US)

(73) Assignee: Murphy Oil USA, Inc., El Dorado, AR (US)

( * ) Notice: Subject to any disclaimer, the term of this patent is extended or adjusted under 35 U.S.C. 154(b) by 39 days.

(21) Appl. No.: 11/171,009

(22) Filed: Jun. 30, 2005

(65) Prior Publication Data

US 2007/0005458 A1 Jan. 4, 2007

(51) Int. Cl.
*G05D 9/00* (2006.01)
*G01F 17/00* (2006.01)
*G01F 23/00* (2006.01)

(52) U.S. Cl. .......................................... 700/281; 702/55
(58) Field of Classification Search ................. 700/281; 702/55
See application file for complete search history.

(56) References Cited

U.S. PATENT DOCUMENTS

| | | | | |
|---|---|---|---|---|
| 4,782,451 A | * | 11/1988 | Mazzarella et al. | 700/281 |
| 5,023,806 A | * | 6/1991 | Patel | 702/55 |
| 6,345,214 B1 | * | 2/2002 | Dulphy-Vigor et al. | 700/281 |
| 6,462,736 B1 | * | 10/2002 | Ross et al. | 345/419 |
| 2004/0117135 A1 | * | 6/2004 | Rogers et al. | 702/55 |

* cited by examiner

*Primary Examiner*—Ryan A Jarrett
(74) *Attorney, Agent, or Firm*—Alston & Bird LLP

(57) ABSTRACT

Systems, apparatus and methods are provided for real-time control of inventory and environmental impacting events. The invention implements statistical analysis of the inventory and environment data at a remote site, typically the site at which the inventory is located or where the environmental impacting event may occur. Once the statistical analysis determines that a significant inventory change has occurred or a significant environmental impacting event has occurred, the inventory data or environmental data is immediately communicated, in real-time, to a central location for monitoring and control, typically a regional or corporate office. The invention has specific relevance and embodiments directed at monitoring and controlling the inventory and environmental events at fuel service stations.

20 Claims, 7 Drawing Sheets

OWNER COMPANY OVERVIEW - DISPATCHER STATUS

SUMMARY CLICK TO SUMMARY
DUPRE JACKSON

| | |
|---|---|
| 6857 - CLINTON - -FE, MS<br>@ 10/2/2003 1:34:00 PM (CT)<br>601-925-1456<br>STATUS<br>PROJECTED JUST IN TIME (UNLEADED)<br>TRANSIT TIME 2 h 30 m<br>KF: 0 h 0 m<br>JIT: 0 h 17 m | VOLUME / ULLAGE<br>T 01: 2112/15621<br>REGULAR UNLEADED<br>T 02: 1814/8867<br>DIESEL<br>T 03: 1154/6051<br>PREMIUM / SUPER |
| 5707 - PEARL, MS<br>@ 10/2/2003 1:31:00 PM (CT)<br>601-939-9150<br>STATUS<br>PROJECTED KEEP FULL (ALL GRADES)<br>TRANSIT TIME 2 h 30 m<br>KF: 0 h 0 m<br>JIT: 4 h 50 m | VOLUME / ULLAGE<br>T 01: 5893/4954<br>REGULAR UNLEADED<br>T 02: 5050/5797<br>PREMIUM / SUPER |
| 6780 - WAYNESBORO- -FE, MS<br>@ 10/2/2003 1:24:00 PM (CT)<br>601-735-5078<br>STATUS<br>PROJECTED KEEP FULL (ALL GRADES)<br>TRANSIT TIME 3 h 15 m<br>KF: 0 h 0 m<br>JIT: 5 h 50 m | VOLUME / ULLAGE<br>T 01: 5140/12593<br>REGULAR UNLEADED<br>T 02: 2439/8224<br>DIESEL<br>T 03: 5054/2151<br>PREMIUM / SUPER |

FIG. 4

OWNER COMPANY OVERVIEW - DISPATCHER STATUS

DETAILS CLICK TO SHOW DETAILS

DUPRE JACKSON

- 6857 - CLINTON --FE, MS
- 5707 - PEARL, MS
- 6780 - WAYNESBORO, FE,MS
- 5531 - BROOKHAVEN, MS
- 5711 - PHILADELPHIA, MS
- 5736 - JACKSON, MS
- 6551 - MAGEE- -FE, MS
- 6642 - RICHLAND --, MS
- 5813 - CARTHAGE, MS
- 6919 - COLUMBIA, FE,MS

5707 - PEARL, MS
TANK INVENTORY

| -12 | -11 | -10 | -9 | -8 | -7 | -6 | -5 | -4 | -3 | -2 | -1 | 0 | 1 | 2 | 3 | 4 | 5 | 6 |
|---|---|---|---|---|---|---|---|---|---|---|---|---|---|---|---|---|---|---|
| 10220 | 10222 | 10223 | 10224 | 10225 | 10226 | 10091 | 9543 | 8973 | 8372 | 7837 | 7189 | 5893 | 5046 | 4152 | 3114 | 2001 | 989 | 98 |
| 5227 | 5227 | 5227 | 5227 | 5227 | 5228 | 5225 | 5191 | 5180 | 5150 | 5146 | 5102 | 5050 | 5007 | 4953 | 4907 | 4851 | 4815 | 479 |

GALLONS

ESTIMATED TIME UNTIL DELIVERY REQUIRED BASED ON PROJECTED USAGE RATES:

KEEP FULL (TOP OF TANK)        0 h 0 m
JUST IN TIME (BOTTOM OF TANK)  4 h 50 m    DELIVERY DETAILS

DAILY SALES OF REGULAR UNLEADED (3 WEEK AVERAGE)

| SUN | MON | TUE | WED | THU | FRI | SAT |
|---|---|---|---|---|---|---|
| 8566.28 | 10451.65 | 9753.22 | 9918.88 | 11483.80 | 12473.97 | 10238.46 |

GALLONS

MESSAGES

NEW MESSAGE | SEND EMAIL

| TO: DUPRE JACKSON | TO: MURPHY USA HQ |
|---|---|
| TIMESTAMP: 10/2/2003 10:59:00 AM (CT) | TIMESTAMP: 10/2/2003 12:16:00 PM (CT) |
| SORRY BRENT, DIDN'T SEE YOUR MESSAGE. THANKS FOR THE ETA. CHAD | 6857'S ETA IS 215 THANKS BRENT |
| TIMESTAMP: 10/2/2003 10:58:00 AM (CT) | TIMESTAMP: 10/2/2003 12:16:00 PM (CT) |
| GOOD MORNING, WHAT IS THE ETA FOR CARTHAGE? THANKS, CHAD | 6857'S ETA IS 2:15 THANKS BRENT |
| | TIMESTAMP: 10/2/2003 10:25:00 AM (CT) |

*FIG. 7*

SYSTEMS AND METHODS FOR REAL-TIME FUEL INVENTORY CONTROL

FIELD OF THE INVENTION

The present invention relates to methods and systems for real-time inventory and environmental control and more specifically to methods and systems for real-time inventory control and environmental control of retail fuel service stations.

BACKGROUND OF THE INVENTION

In order for businesses to remain competitive it is imperative that they maintain a constant inventory of the products or goods that they are marketing or selling. Failure to maintain inventory will typically result in customers pursuing other options for obtaining similar products or goods. For example, in the retail sale of automotive fuel at service stations, if a service station is plagued by persistent fuel run-outs, consumer loyalty will fade and fuel sales by the service station will invariably suffer.

For certain industries, the problem of maintaining inventory is exasperated by secondary factors such as high-volume sales, rapid changes in product demand and limitations on the capacity to store the product at the point of sale. This is especially true of the retail sale of automotive fuel at service stations. While fuel sales will generally be high-volume in nature, it is often difficult to anticipate or predict rapid changes in sales trends. In addition, fuel stations are limited, by the capacity of the fuel tanks, to how much fuel inventory they can account for at any given time. Thus, for fuel service stations to maintain a constant fuel inventory, inventory must be monitored and delivery of fuel to the service station must be accomplished in a timely fashion. However, in this type of market simply monitoring inventory and inventory fluctuation on a daily or even hourly basis may not be sufficient to insure against run-outs. It may be necessary in this type of market to monitor the inventory data and sales rates in real-time, so that delivery of additional inventory is properly coordinated. In the retail fuel industry, proper coordination of fuel delivery not only addresses eliminating the likelihood of run-outs but also insures that fuel does not arrive at the service station until full loads of fuel can be accepted by the fuel tanks.

An additional problem for businesses that encounter ongoing environmental concerns is the ability to monitor actual or potential environmental impacting events. In much the same fashion as the inventory example discussed above, the monitoring of these events will typically require the monitoring to occur in real-time. Real-time monitoring is necessary so that potential environmental disasters can be averted. In many instances real-time monitoring is not limited to the location at which the environmental impacting event occurs but extends to real-time monitoring of the event at remote locations, such as regional or corporate offices.

Computer networking has made it possible to deliver data in real-time. However, the ability to deliver real-time data can often be impractical and economically inefficient due to factors such as, the amount of information transmitted, the communication medium used to transmit the information and the amount of processing time involved in analyzing the raw data. For example, inventory data can be monitored at the point-of sale and sent electronically to a remote home office site. In this same regard, environmental impacting events can be monitored at a remote location and sent electronically to a remote home office site. Typically, the monitoring and transmission of the data would require sending a large amount of data to the home office, by satellite transmission, and processing the data at the central office to determine the necessary steps needed to control the inventory or the environmental impacting event. This process typically would involve a home office server polling each individual remote site at prescribed intervals to determine current inventory volumes or environmental status. This system of monitoring inventory or environmental events is typically not economically viable because the large amount of data that is transmitted to the home office requires significant communication bandwidth between the multiple remote sites and the central home site. In addition, this system does not provide for true "real-time" data because the polling at the home office is limited to predefined intervals, which are typically relatively long intervals to allow for all the remote sites to be polled and for all the data at the sites to be transmitted.

The need exists to develop a system for real-time monitoring of inventory and monitoring environmental impacting events. The system should be capable of providing real-time data to remote locations in an economically viable manner. In addition, the system should be capable of implementing the necessary inventory control alarms and environmental alarms so that immediate steps can be taken to insure inventories are maintained and environmental impacting events are addressed. The system should benefit those industries where the sales of goods or products are typically high-volume, the ability to predict changes in sales rates is speculative and inventory storage capacity is limited.

BRIEF SUMMARY OF THE INVENTION

The present invention provides for systems, apparatus and methods for real-time monitoring of inventory data and environmental data. The invention implements statistical analysis of the inventory and environment data at a remote site, typically the site at which the inventory is located or where the environmental impacting event may occur. Once the statistical analysis determines that a significant inventory change has occurred or a significant environmental impacting event has occurred, the inventory data or environmental data is immediately communicated, in real-time, to a central location, typically a regional or corporate office. As such, the present invention benefits from having only significant inventory and environmental data transmitted from multiple remote sites to a central location. In the instance in which the data is communicated via satellite, this means that less cost-prohibitive bandwidth is required to transmit the data. Thus, the invention provides an economically viable option for real-time, central location monitoring of the inventory and environmental data of multiple remote sites.

The present invention has specific applicability to the sale of fuel at service stations. Typically, fuel companies will have multiple retail service stations and will have the need to monitor, at a central location, both the inventory of fuel at these service stations and the environmental impacting events (i.e., fuel leaks or spills) that occur at these sites. Due to the high-volume sale of fuel, the difficulty in predicting fuel sale trends and the limited inventory storage capacity at the service station, monitoring inventory in real-time is essential to insuring that the service station does not incur a fuel run-out.

In one embodiment of the invention a system for the real-time control of inventory between a remote fuel service station and a central location is defined. The system will include one of more data collection hosts located at a remote fuel service station that implement a data collection routine to collect fuel inventory data from service station fuel tanks. Additionally, the system will include a statistical control host, typically disposed at the remote fuel service station, and in communication with the data collection host(s). The statistical control hosts receive inventory data from the one or more data collection host and implement a statistical control routine that analyzes the fuel inventory data to determine if a significant inventory control event has occurred. Significant inventory events will typically trigger an inventory alarm that justifies real-time transmission to an inventory monitoring entity. Significant inventory events may be defined as inventory reaching a minimum threshold, unexpected change in rate of fuel sale or any other inventory event that would justify immediate notification to an inventory monitoring entity. The system will additionally include a central host located at a central location that is in communication with the statistical control host and receives real-time communication from the statistical control host upon the statistical control routine determining that a significant inventory control event has occurred. In addition to the real-time communications, the central host will typically receive scheduled communications from the statistical control host that include routine inventory data.

In addition, the system may also include a third party host that is in communication with the central host and receives real-time communication from the central host related to the significant inventory control event. The third party host will typically be a fuel dispatcher host that receives inventory data for the purpose of assessing fuel needs at multiple service stations and assigning delivery of fuel based on current fuel inventories and projected fuel inventories.

In an alternate embodiment of the invention a system for the real-time control of environmental impacting events between a remote fuel service station and a central location is defined. The system will include one of more data collection hosts located at a remote fuel service station that implement a data collection routine to collect data related to environmental impacting events occurring at a fuel service station. Additionally, the system will include a statistical control host, typically disposed at the remote fuel service station, and in communication with the data collection host(s). The statistical control hosts receive data related to environmental impacting events from the one or more data collection host and implement a statistical control routine that analyzes the data to determine if a significant environmental impacting event has occurred. Significant environmental impacting events will typically trigger an environmental alarm that justifies real-time transmission to an environmental event monitoring entity. Significant environmental impacting events may be defined as fuel leaks in the tanks, lines or pumps, fuel spills at the service station or any other environmental impacting event that would justify immediate notification to an environmental event monitoring entity. The system will additionally include a central host located at a central location that is in communication with the statistical control host and receives real-time communication from the statistical control host upon the statistical control routine determining that a significant environmental impacting event has occurred.

The invention is further embodied in a statistical control host that includes an input that that receives inventory data related to fuel inventory at a service station, a statistical control routine that performs statistical analysis on the inventory control data to determine if a significant inventory control event has occurred at the fuel service station; and an output that transmits an inventory alarm to a remote central host if a determination is made that a significant inventory event has occurred. Additionally, the statistical control host may be configured for the input to receive environmental data related to environmental impacting events occurring at the service station, with the statistical control routine performing statistical analysis on the environmental data to determine if a significant environmental impacting event has occurred at the fuel service station.

In another embodiment of the invention, a method for communicating real-time fuel inventory data in a communication network includes the steps of receiving fuel inventory data from one or more data collection hosts that collect fuel inventory data at a service station, analyzing statistically the fuel inventory data to determine if a significant inventory event has occurred and communicating, in real-time, the inventory data to a remote central host if a determination is made that a significant inventory event has occurred. The significant inventory event may be inventory below a predefined threshold, significant change in rate of sales, or any other predefined significant inventory event. In a similar embodiment a method for communicating real-time, fuel service station, environmental data in a communication network includes the steps of receiving environmental data from one or more data collection hosts that collect environmental impacting data at a service station, analyzing statistically the environmental data to determine if a significant environmental impacting event has occurred and communicating, in real-time, the environmental data to a remote central host if a determination is made that a significant environmental impacting event has occurred. The environmental impacting event may be a fuel leak in a tank, line or pump, a fuel spill or any other significant environmental impacting event.

In addition to the embodiments above, which claim systems, methods and apparatus for real-time inventory control and environmental control in a fuel service station scenario, the invention may also be defined in the more general terms of systems, methods and apparatus for real-time inventory control and environmental control of other remote inventory sites that are in network communication with a central site, such as a regional or corporate office site.

In yet another embodiment of the invention, a computer application for providing fuel inventory control data is defined. The computer application includes a means for providing a visual display of a real-time fuel service station inventory chart that includes a running list of prior fuel inventory, current fuel inventory, and projected fuel inventory. The application may additionally include a means for providing a visual display of an estimate on when service station fuel tanks are capable of taking a full delivery load of fuel and an estimate of when service station fuel tanks will run-out of fuel. In addition, the application may include a means for providing a visual display of an average of daily fuel sales for each day of the week at the service station.

As such the present invention fulfills the need for a system for real-time monitoring and control of inventory and monitoring and control of environmental impacting events. The system is capable of providing real-time data to remote locations in an economically viable manner. In addition, the system is capable of implementing the necessary inventory control alarms and environmental alarms so that immediate steps can be taken to insure inventories are maintained and environmental impacting events are addressed. The system benefit those industries, such as the automotive fuel sales industry, in which the sales of goods or products are typically high-volume, the ability to predict changes in sales rates is speculative and inventory storage capacity is limited.

BRIEF DESCRIPTION OF THE DRAWINGS

Figure 1:
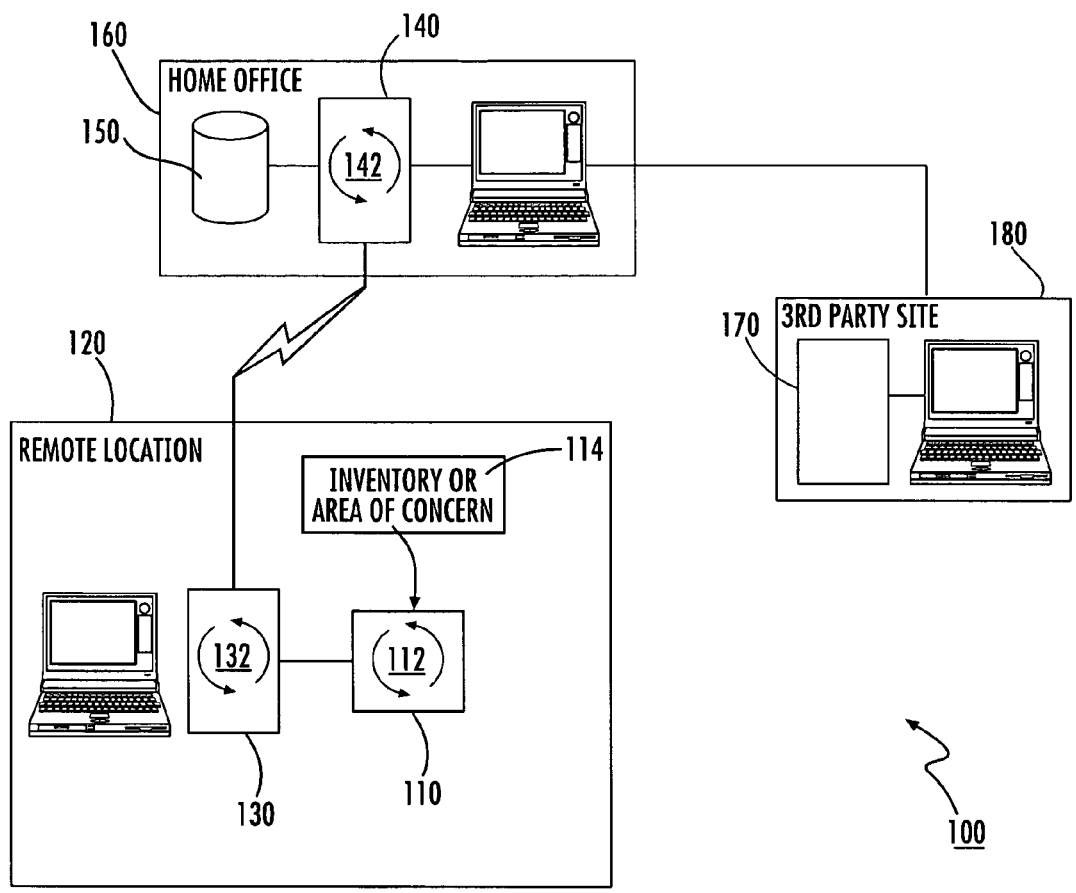

Having thus described the invention in general terms, reference will now be made to the accompanying drawings, which are not necessarily drawn to scale, and wherein:

FIG. 1 is a schematic overview of a system for real-time inventory control or real-time environmental event control, in accordance with an embodiment of the present invention.

Figure 2:
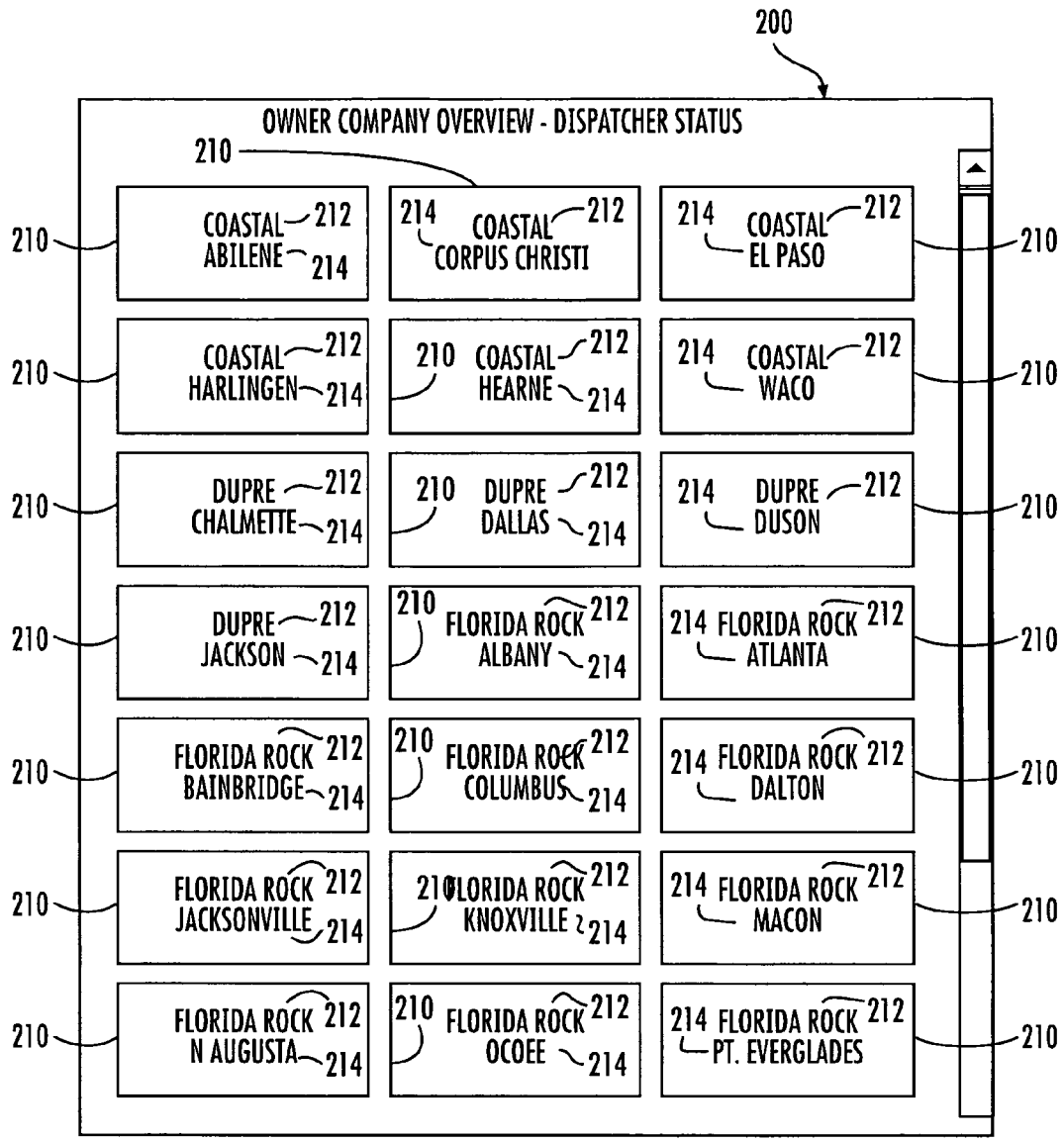

FIG. 2 is an illustration of a dispatcher listing window or display screen as implemented in an application for providing a third party fuel dispatcher and home office representatives with real-time inventory control data, in accordance with an embodiment of the present invention.

Figure 3:
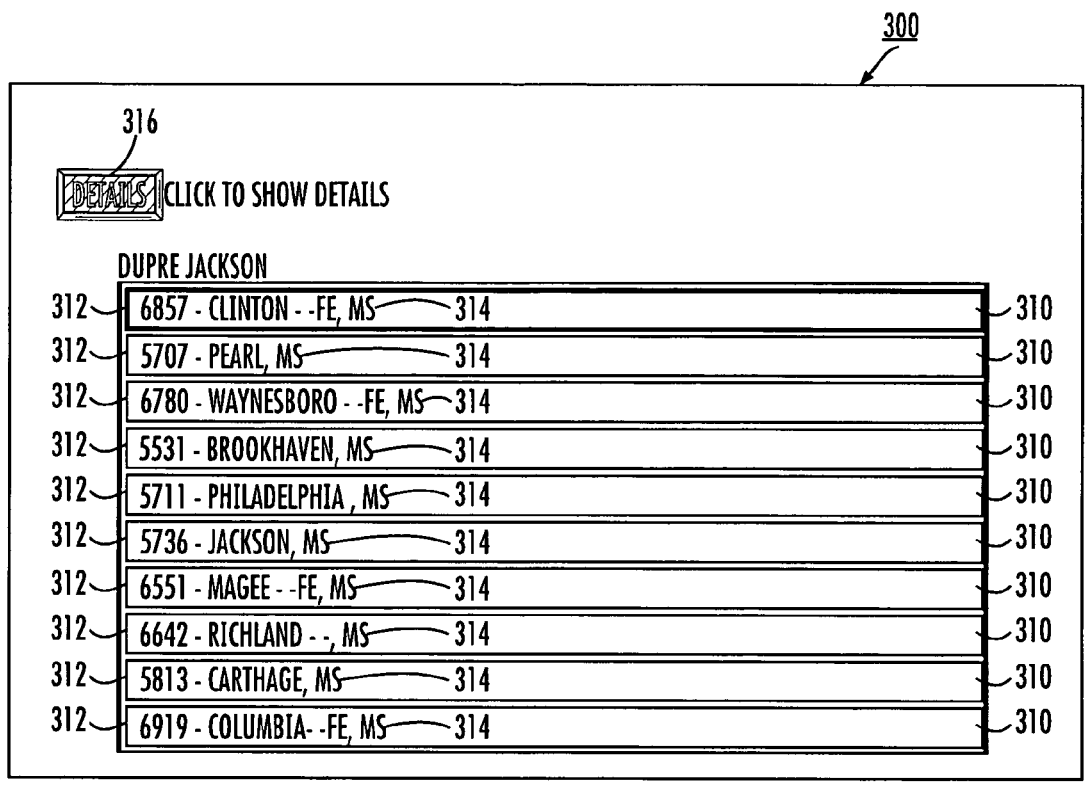

FIG. 3 is an illustration of a dispatcher's service stations window or display screen as implemented in an application for providing a third party fuel dispatcher and home office representatives with real-time inventory control data, in accordance with an embodiment of the present invention.

FIG. 4 is an illustration of a detailed dispatcher's service station listing window or display screen as implemented in an application for providing a third party fuel dispatcher and home office representatives with real-time inventory control data, in accordance with an embodiment of the present invention.

Figure 5:
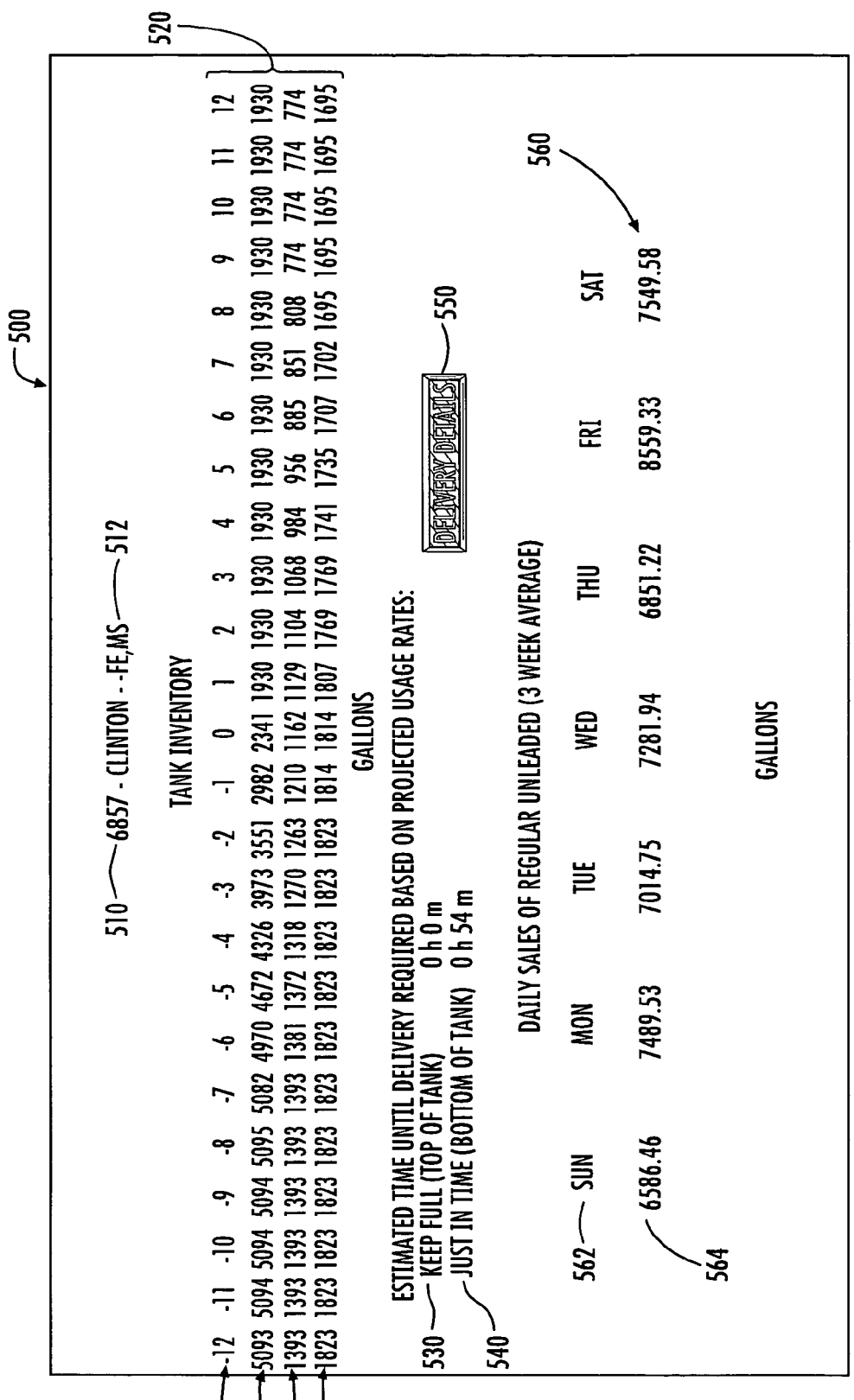

FIG. 5 is an illustration of a service station tank inventory window or display screen as implemented in an application for providing a third party fuel dispatcher and home office representatives with real-time inventory control data, in accordance with an embodiment of the present invention.

Figure 6:
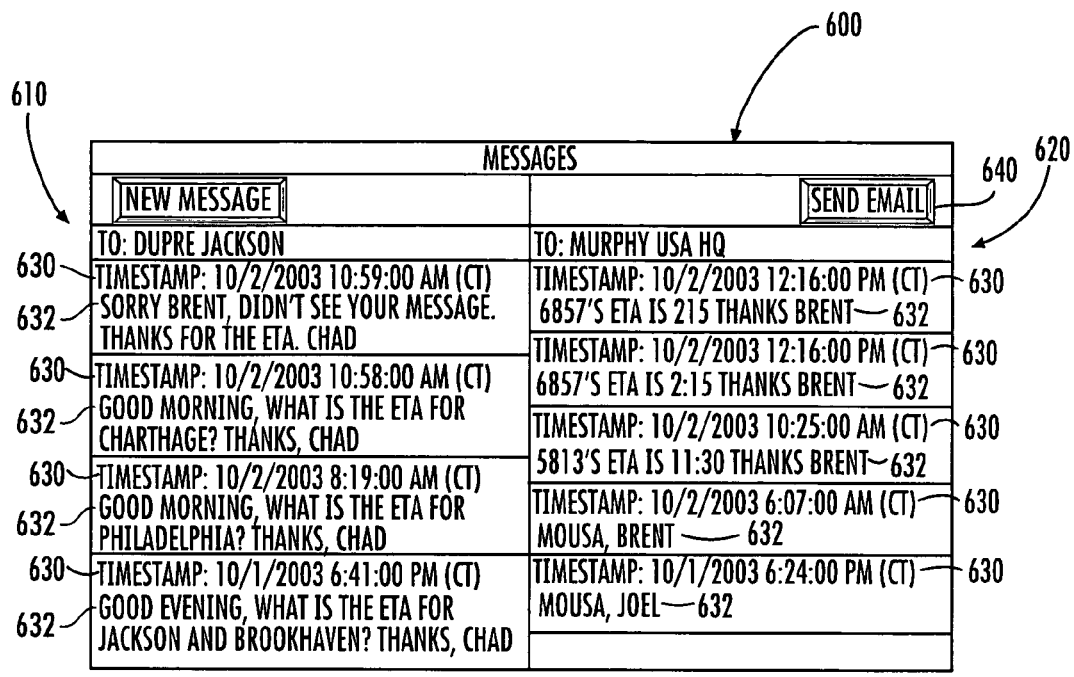

FIG. 6 is an illustration of a message log window or display screen as implemented in an application for providing a third party fuel dispatcher and home office representatives with real-time inventory control data, in accordance with an embodiment of the present invention.

FIG. 7 is an illustration of a composite display of multiple windows in a system for providing a third party fuel dispatcher and home office representatives with real-time inventory control data, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for methods and systems for real-time inventory control and environmental control of products that require such. For example, in one specific embodiment of the present invention real-time inventory control and environmental control is provided for the retail sale of fuel at service stations. The methods and systems of the present invention benefit from monitoring and analyzing the inventory and environmental data at a remote site, such as at a fuel service station prior to transmitting the data to a central location. By monitoring and analyzing the data at the remote site the present invention is able to determine if significant changes have occurred in the inventory or if significant environmental changes have occurred that would warrant immediate, real-time, communication of the data from the remote site to a centralized home site. If a determination is made at the remote site that sales trends, current inventory volumes or environmental impacting events warrant immediate, real-time, transmission the data is immediately communicated to the central location. Thus, the monitoring and analyzing of the data at the remote site limits the amount of data which must be sent to the centralized home site and, thereby, limits the amount of satellite bandwidth that must be used to communicate the information from multiple remote sites to a centralized home site.

In addition the present invention provides for methods and systems for a centralized home site and/or product distributor to monitor, in real-time, the inventory and environmental concerns of numerous remote sites. For example, in one specific embodiment, retail fuel service stations provide real-time inventory data related to fuel sales and real-time environmental data related to fuel leaks to a centralized office and to fuel distributors. The centralized office and the fuel distributors are able to access this real-time information and react accordingly to inventory fuel shortages or events having environmental impact.

FIG. 1 provides a schematic overview of a system for real-time inventory control, in accordance with an embodiment of the present invention. The real-time inventory control system 100, will include one or more data collection hosts 110 that implement a data collection routine 112. The data collection host(s) will reside at a remote location 120 and the data collection routine will monitor the current inventory 114 of a product or commodity. For example, in the fuel service station embodiment the data collection routine will monitor the current inventory of fuel in related fuel tanks. The data collection host(s) 110 is in network communication with a statistical control host 130 that implements a statistical control routine 132. The network link between the data collection hosts and the statistical control host will typically be a standard serial type connection, a modem type connection or any other suitable connection capable of providing for real-time communication of inventory data. Typically, and as shown in FIG. 1, the statistical control host will reside at the remote location where the product is being inventoried. However, it is possible to dispose the statistical control host at a location remote from the data collection host(s). The statistical control routine is responsible for monitoring the inventory data and determining if a predefined significant inventory change event has occurred. The statistical control hosts will either receive data from the data collection hosts or poll the data collection hosts for data at predefined intervals. The statistical control routine will typically be an application routine capable of being implemented on a Microsoft (Redmond, Wash.) Windows™ operating system platform.

For example, in the fuel service station embodiment the statistical control host will typically reside at the fuel service station. Thus, for a fuel company with numerous fuel service stations located throughout a wide area, numerous statistical control hosts will be implemented in the network, typically one per each fuel service station. At the fuel service station the statistical control routine will determine, based upon the inventory data that it receives from the data collection hosts, whether a significant inventory change event has occurred. For example, if the rate of fuel sales has significantly increased over a relatively short period of time the statistical control routine would identify this as significant inventory change event. Additionally, if the data collection host indicates that the inventory has increased, the statistical control routine will recognize the increase as a delivery of fuel and identify such as a significant inventory change event.

The statistical control host(s) 120 is in network communication with one or more central hosts 140 that may implement a data consolidation and analysis routine 142. Typically the central host will reside at a regional or national home office 160 and run on a standard Microsoft Windows™ operating system platform. In one embodiment of the invention the statistical control host will be in satellite network communication with the central host, although other network links are also possible and within the inventive concepts herein disclosed. If the statistical control routine determines that a statistically significant inventory change event has occurred then this inventory data is immediately transmitted from the statistical control host to the central host. In addition to transmitting, in real-time, statistically significant inventory change data to the central host, the statistical control routine will also be responsible for transmitting routine inventory data to the central host on a predefined schedule. The data consolidation and analysis routine is responsible for synthesizing the data that the central host receives from the multiple statistical control hosts and formatting the data as the application dictates.

For example, in the fuel service station embodiment of the invention, if the statistical control routine determines that fuel inventory is being depleted at a faster than anticipated rate, then this data is immediately transmitted to the central office. In addition, the statistical control routine will send the central host all routine inventory data on a prescribed schedule, for example once every thirty minutes.

The central host 140 will typically be in communication with a data storage device 150 that provides for inventory control data to be stored at a central location. The stored inventory control data may be accessed in conjunction with the data consolidation and analysis routine 142. In the fuel service station embodiment stored data may include, fuel tank volume and level, water volume and level, interstitial level, pump sump level, fuel temperature and calculated sell-off rate.

The real-time inventory control system of the present invention provides for the central host to maintain real-time critical inventory data without the need to have non-critical inventory data constantly transmitted from the inventory locale. By statistically determining significant inventory change events at the inventory locale, the amount of data that is required to be transmitted to the central host is significantly reduced and the amount of processing performed at the central host is significantly reduced. In the embodiment in which the communication link between the statistical control hosts and the central host is a satellite link, this means that significantly less bandwidth is required to transmit the real-time data from the remote locations to the central office. Therefore, by statistically analyzing the data prior to transmission to the central host and by transmitting the data only when significant inventory change events occur this invention provides a practical and economically viable method for collecting real-time data from multiple remote sites without sacrificing the real-time integrity of the data.

The central host will also typically have the capability to disseminate the statistical control routine to the statistical control host, provide clock synchronization, adjust the prescribed data schedule interval and make ad-hoc adjustments to the statistical control hosts related to inventory control.

The central host 140 may be in communication with a third party host 170 for the purpose of relaying the real-time inventory control data to a third party. In most embodiments in which third party communication is required the third party host will reside at a third party site 180, which is typically remote from the home office site 160. The communication link between the central host and the third party host may be a standard network medium, such as the Internet or the like. For example, in the fuel service station embodiment the third party host may be a fuel dispatcher host that allows the fuel dispatcher to view real-time inventory data, typically by accessing a web browser and a specified web page. In this regard the fuel dispatcher is able to ascertain, in real-time, the level of fuel currently available at fuel service stations and view real-time data related to when a fuel service station will run out of fuel. Based on this real-time information fuel dispatchers can re-direct fuel trucks to specific remote locations to accommodate fuel stations that are at risk of a fuel run-out. By providing fuel dispatchers with real-time data related fuel inventory, the fuel dispatchers are more equipped to insure that fuel stations are adequately supplied with fuel at any given time.

The third party hosts will also be capable of communicating with the central host, such that the third party hosts can communicate information to the central host for storage in the data storage device. In the fuel service station embodiment, data that may be communicated from the third party host to the central host and subsequently stored includes, calculated estimated time to deliver fuel to a remote service station, and data related to a specific delivery, such as Bill of Lading (BOL) number, originating terminal, supplier, and the like.

FIGS. 2-7, which will be discussed at length infra, illustrate an application for providing a third party fuel dispatcher and home office representatives with real-time inventory control data, in accordance with an embodiment of the present invention.

In an alternate embodiment of the present invention methods and systems for real-time environmental control are provided. Similar to the inventory control embodiment, the schematic architecture for the network shown in FIG. 1 is consistent with the environmental control embodiment. The real-time environmental control system 100, will include one or more data collection hosts 110 that implement a data collection routine 110. The data collection host will typically reside at a remote location 120 and the data collection routine will monitor the environmental events associated with an area of concern 114. For example, in the fuel service station embodiment the data collection routine will monitor the fuel pumps, fuel lines and the fuel tanks for fuel leaks, fuel spills or other environmentally impacting events. The data collection host(s) 110 is in network communication with a statistical control host 130 that implements a statistical control routine 132. Typically, a statistical control host will reside at the site where the area is being monitored for environmental events. The statistical control routine is responsible for monitoring the environmental events and determining if a significant environmental event has occurred based on predefined environmental limits. The statistical control host will either receive data from the data collection hosts or poll the data collection host(s) for data at predefined intervals.

For example, in the fuel service station embodiment the statistical control routine 132 will determine, based upon the environmentally impacting data that it receives from the data collection host(s) 110, whether a significant environmental event has occurred. This typically is accomplished by comparing the environmental impacting data to predefined environmental thresholds. In one example, the data collection hosts will be in communication with sensors that monitor for liquids in sumps or interstitials. In this instance, the statistical control reduces to a simple binary decision of liquid present or liquid not present. The statistical control host 130 polls the data collection host(s) for sensors that are in an alarm state, i.e., liquid is present. As a check on the status of such alarms, the statistical control host also polls the data collection host(s) for the status of each sensor in order to have available positive information for each sensor that is in the normal state, i.e., liquid not present. For other parameters such as water levels in the bottom of fuel tanks, or high fuel levels that could lead to an overfill, these parameters generate alarms by comparison to predefined levels. If an alarm occurs, all related data for the fuel station is immediately transferred from the statistical control host to the central host 140.

The statistical control host 130 is in network communication with one or more central hosts 140 that typically implement a data consolidation and analysis routine 142. If the statistical control host determines that a statistically significant environmental event has occurred then this environmental impacting data is immediately transmitted to the central host.

For example, in the fuel service station embodiment of the invention, if the statistical control host determines that a fuel leak or a fuel spill has occurred, then this data is immediately transmitted to the central office. This system of real time environmental control allows for the central host (i.e., the regional or central office) to become immediately aware, in real-time, of any environmentally impacting event, such as fuel spills, fuel leaks or the like.

The central host will also have the capability to disseminate the environmental event statistical control routine to the statistical control host, provide clock synchronization, and make ad-hoc queries to the statistical control hosts related to environmental control.

The central host 140 may be in communication with a third party host 170 for the purpose of relying the environmental control data to a third party.

As is apparent to one of ordinary skill in the art, alternate embodiments of the present invention will include systems and methods for both real-time inventory control and real-time environmental control.

FIGS. 2-6 illustrate an application for providing real-time inventory information to a central site or a third party site, in accordance with an embodiment of the present invention. The application is Microsoft Windows™ based and allows for real-time inventory data to be presented to the central site representative or third party representative in standard windowing format. In the illustrated embodiment, the real-time inventory data is related to fuel inventory at service stations and the third parties are fuel dispatchers.

FIG. 2 provides an illustration of a dispatcher listing window or screen. The dispatcher listing window 200 comprises a plurality of dispatcher access keys 210. The dispatcher access keys include text fields for dispatcher name 212 and dispatcher location 214. The dispatcher access keys may be activated, typically via a mouse interface clicking function, to access inventory data for the individual service stations that a dispatcher is associated with. The dispatcher access keys may be colored coded to indicate the status of the service station fuel needs. For example, a green coded key may indicate that none of the service stations in the dispatcher's territory currently have the capacity to accept a fuel delivery load, a yellow coded key may indicate that one or more service stations within the dispatcher's territory are in position to accept a fuel load and a red coded key may indicate that one or more service stations within the dispatcher's territory are in an alarm inventory state, meaning that delivery of a fuel load is critical to insure that a fuel run-out does not occur.

FIG. 3 provides an illustration of a dispatcher's service stations window, in accordance with an embodiment of the present invention. The dispatcher's service station window 300 is typically visible to the dispatcher upon activation of a dispatcher access key 210, as shown in FIG. 2. The dispatcher's service station window will typically be displayed to the dispatcher as one of several windows in a conventional window format, as shown in FIG. 7 and described infra. The dispatcher's service station window includes a listing of all fuel service stations in the dispatcher's territory. The fuel service station keys 310 include text fields for the service station number 312 and the service station location 314. Activation of a fuel service station key will provide the dispatcher with a fuel tank inventory window, which is illustrated in FIG. 5 and described infra. The fuel service station keys may be colored coded to indicate the status of the service station fuel needs. For example, a green coded key may indicate the service station currently has the capacity to accept a fuel delivery load, a yellow coded key may indicate the fuel service station is in position to accept a fuel load and a red coded key may indicate that the fuel service stations is in an alarm inventory state, meaning that delivery of a fuel load is critical to insure that a fuel run-out does not occur.

The dispatcher's service station window may also include a details key 316 that provides access to a more detailed dispatcher's service station window. FIG. 4 provides an illustration of a detailed dispatcher's service station listing window, in accordance with an embodiment of the present invention. The detailed service station listing window 400 includes a detailed listing 402 for all of the service stations listed in the summary dispatcher's service station window 300, shown in FIG. 3. Each service station listing includes text fields for the service station number 410, the service station location 412, the service station telephone number 414 and the time stamp 416. The time stamp corresponds to when inventory data was last received from the service station. The service station listing may also include a service station status window 420 that displays the current fuel inventory status of the service station. For example, the following statuses may be indicated (1) projected "Just in Time" status indicates that fuel inventory for one or more specified grades is currently in danger of a run-out based on the current projected fuel delivery schedule; (2) projected "Keep Full" status indicates that fuel inventory for one or more specified grades is currently at a volume level which would allow for a full delivery load to be accepted; (3) projected "OK" status indicates that fuel inventory is such that no fuel delivery is currently warranted. In addition, the fuel status windows may be color-coded to indicate the current status.

The detailed dispatcher's service station listing window 400 may also include a transit time activation key 430 and a corresponding text field for transit time 432. Transit time is defined as the estimate time for delivery of fuel from a fuel terminal to the service station. The transit time activation key activates a window (not shown) that allows the dispatcher or other system user to change the transmit time. In addition, the detailed listing window provides text fields for Keep Full time (KF) 440 and Just in Time (JIT) 442. Keep Full Time is defined as the estimated time at which the service station can take a full load delivery of fuel and Just in Time is defined as the estimated time before a fuel run-out will occur at the service station.

The detailed dispatcher's service station listing window 400 may also include a bar graph 460 that indicates current fuel volumes for each fuel tank at the service station. The bar graph may include text fields that include fuel tank number 450, current fuel tank volume (gallons) 452, fuel tank capacity (gallons) 454, and fuel grade type 456. The bar graph indicates the current fuel tank volume in the shaded portion of the bar and the current unfilled portion (i.e., ullage) of the fuel tank in the unshaded portion of the bar. The detailed window will also include a summary activation key 470 that accesses the summary service station listing 300, of FIG. 3.

FIG. 5 provides an illustration of a service station tank inventory window, in accordance with an embodiment of the present invention. The tank inventory window 500 will typically be accessed by activating the corresponding service station key 310 of the service station listing 300 or activating the corresponding detailed listing 402 of the detailed service station window 400. The tank inventory window includes header information that indicates service station number 510 and service station location 512. The tank inventory chart 520 is a rolling time listing of current fuel volume and fuel projections for each tank at the service station. The rolling time line 522 provides current tank volume, tank volume for the previous twelve hours and projections for tank volume for the next twelve hours. The horizontal lines 524, 526, 528, indicate fuel volumes (in gallons) for each fuel tank at the service station. Typically, the tanks will be identifiable on the tank inventory window by color-coding the horizontal lines.

The tank inventory window 500 may also include text fields for Keep Full Time 530 and Just In Time 540. These parameters are identical to the parameters shown in the detailed dispatcher's service station list 400, identified in FIG. 4 as KF 440 and JIT 442. As previously noted, Keep Full Time is defined as the estimated time at which the service station can take a full load delivery of fuel and Just in Time is defined as the estimated time before a fuel run-out will occur at the service station. The tank inventory control window may also include a delivery details activation key 550 that engages a delivery detail window (not shown). The delivery detail window provides the dispatcher with input fields related to the current on route fuel delivery.

In addition, the tank inventory window 500 may include daily average fuel sales totals 560. In the embodiment shown in FIG. 5, the daily average fuel sales totals are for regular unleaded fuel sales and provide for a three-week average for the specified day of the week. Horizontal line 562 indicates the days of the week and the average fuel sales (in gallons) 564 for that particular day is listed below the corresponding day of the week.

FIG. 6 provides an illustration of a message log window 600, in accordance with an embodiment of the present invention. The message log window provides for a running dialogue between a fuel dispatcher and a fuel company representative. The running dialogue allows all system operators (i.e., various dispatchers and fuel company representatives) to have access to the stream of communication between dispatcher and home office. In the embodiment shown in FIG. 6, the dispatcher messages 610 are logged in the left-hand column and the fuel company representative messages 620 are logged in the right-hand column. The messages may include a timestamp 630 and a text field 632. In addition, an email access key 640 may be implemented to provide the dispatcher or fuel company representative with access to a more secure communication channel.

FIG. 7 provides an illustration of a composite display of windows in the system for providing real-time inventory information to a central site or a third party site, in accordance with an embodiment of the present invention. The composite display 700 provides for the display of the dispatcher's service station list 300, the fuel station tank inventory list 500 and the message log window 600. The service station tank inventory list may be changed to another service station by activating the service station key 310 in the dispatcher's service station list 300.

As such the present invention fulfills the need for a system for real-time monitoring and control of inventory and monitoring and control of environmental impacting events. The system is capable of providing real-time data to remote locations in an economically viable manner. In addition, the system is capable of implementing the necessary inventory control alarms and environmental alarms so that immediate steps can be taken to insure inventories are maintained and environmental impacting events are addressed. The system benefit those industries, such as the automotive fuel sales industry, in which the sales of goods or products are typically high-volume, the ability to predict changes in sales rates is speculative and inventory storage capacity is limited.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for inventory control, the system comprising:
one or more data collection hosts disposed at a fuel service station, each data collection host implementing a data collection routine and collecting fuel inventory data from at least one service station fuel tank that contains a volume of fuel;
a statistical control host in communication with the one or more data collection hosts, the statistical control host receiving and at least temporarily storing the fuel inventory data from the one or more data collection hosts and implementing a statistical control routine that analyzes the fuel inventory data and identifies a significant inventory control event;
a central host disposed at a location remote from the statistical control host, the central host in network communication with the statistical control host, the central host receiving and at least temporarily storing data corresponding to the identified significant inventory control event from the statistical control host in real time upon the statistical control routine identifying the significant inventory control event; and
a display in communication with at least one of the statistical control host and the central host, the display displaying an estimated time at which the fuel service station will be capable of taking a full delivery load of fuel.

2. The system of claim 1, further comprising a third party host that is in communication with the central host, that receives from the central host real-time communication of data corresponding to the significant inventory control event, and that at least temporarily stores the data corresponding to the significant inventory control event.

3. The system of claim 2, wherein the third party host is further defined as a fuel dispatcher's host.

4. The system of claim 1, wherein the significant inventory control event is a significant change in the rate of fuel sales.

5. The system of claim 1, wherein the statistical control routine analyzes the fuel inventory data and identifies the significant inventory control event by comparing the inventory control data to predefined alarm thresholds.

6. The system of claim 1, wherein the central host further receives, and at least temporarily stores, general inventory control data from the statistical control host at predefined intervals.

7. A method for communicating real-time fuel inventory data in a communication network, the method comprising:

receiving fuel inventory data from one or more data collection hosts that collect fuel inventory data at a service station where at least one fuel tank contains a volume of fuel;

at least temporarily storing the fuel inventory data;

analyzing statistically the fuel inventory data and identifying a significant inventory event;

communicating, in real-time, the fuel inventory data to a remote central host upon identifying the significant inventory event; and displaying an estimated time at which the service station will be capable of taking a full delivery load of fuel.

8. The method of claim 7, wherein the step of analyzing statistically the fuel inventory data and identifying a significant inventory event comprises analyzing statistically the fuel inventory data and identifying a significant change in the volume of fuel contained in the fuel tank.

9. The method of claim 7, further comprising displaying the current volume of fuel in the fuel tank and at least one of the volume of fuel in the fuel tank at a previous time and a projected volume of fuel in the fuel tank at a future time such that a rolling time listing of the volume of fuel in the fuel tank is displayed.

10. The method of claim 9, wherein displaying the current volume of fuel in the fuel tank and at least one of the volume of fuel in the fuel tank at a previous time and a projected volume of fuel in the fuel tank at a future time comprises displaying a rolling time listing of the current volume of fuel in the fuel tank, the volume of fuel in the fuel tank for each of the previous twelve hours, and the projected volume of fuel in the fuel tank for each of the next twelve hours.

11. The method of claim 7, further comprising displaying an estimated time remaining before a fuel run-out will occur.

12. The method of claim 7, further comprising displaying average fuel sales data for each day of a week, the average fuel sales data corresponding to fuel sales occurring over at least two previous weeks.

13. A system for real-time inventory data communication, the system comprising:

one or more data collection hosts in a common location with a quantity of inventory, each data collection host implementing a data collection routine and collecting inventory quantity data;

a statistical control host disposed at the common location and in communication with the one or more data collection hosts, the statistical control host receiving and at least temporarily storing the inventory quantity data from the one or more data collection hosts and implementing a statistical control routine that analyzes the inventory quantity data and identifies a significant inventory control event;

a central host disposed at a location that is remote from the common location, the central host disposed in communication with the statistical control host, the central host receiving and at least temporarily storing data corresponding to the identified significant inventory control event from the statistical control host in real time upon the statistical control routine identifying the significant inventory control event; and a display in communication with at least one of the statistical control host and the central host, the display displaying an estimated time at which the common location will be capable of taking a full delivery load of inventory.

14. The system of claim 13, further comprising a third party host that is in communication with the central host, that receives from the central host real-time communication of data corresponding to the significant inventory control event, and that at least temporarily stores the data corresponding to the significant inventory control event.

15. The system of claim 13, wherein the statistical control routine analyzes the inventory quantity data and identifies the significant inventory control event by comparing the inventory quantity data to at least one predefined threshold.

16. The system of claim 13, wherein the central host further receives inventory quantity data from the statistical control host at predefined intervals, and at least temporarily stores the inventory quantity data.

17. A method for communicating real-time inventory data in a communication network, the method comprising:

receiving and at least temporarily storing inventory data from one or more data collection hosts that collect inventory data;

analyzing statistically the inventory data and determining that a significant inventory event has occurred;

communicating, in real-time, the inventory data to a central host upon determining that the significant inventory event has occurred, the central host located remotely from the one or more data collection hosts;

storing the inventory data at least temporarily at the location of the central host; and displaying an estimated time at which the location of at least one data collection host will be capable of taking a full delivery load of inventory.

18. The method of claim 17, further comprising displaying current inventory data and at least one of inventory data from a previous time and projected inventory data corresponding to a future time such that a rolling time listing of inventory data is displayed.

19. The method of claim 17, further comprising displaying an estimated time remaining before an inventory run-out will occur.

20. The method of claim 17, further comprising displaying average inventory sales data for each day of a week, the average inventory sales data corresponding to sales occurring over at least two previous weeks.

* * * * *